Fig. 1.

Inventor:
Allan J. Wade,
by Harry E. Dunham
His Attorney.

Patented Nov. 26, 1940

2,223,195

UNITED STATES PATENT OFFICE 2,223,195

CONTROL SYSTEM

Allan J. Wade, Schenectady, N. Y., assignor to General Electric Company, a corporation of New York Application October 7, 1938, Serial No. 233,780

19 Claims. (Cl. 172—293)

This invention relates to motor control systems, more particularly to systems for controlling the operation of a plurality of commutator type brush shifting motors, and an object of the invention is the provision of a simple, reliable and improved control system of this character.

More particularly, the invention relates to control systems for a plurality of commutator type brush shifting motors which are connected to drive the sections of an apparatus or machine which has a number of sections that are required to operate at correct relative speeds with respect to each other. For example, a paper making machine has a number of individual sections which must operate at correct relative speeds. Owing to the stretch or "draw" in the web as it progresses from the wet end to the dry end of the machine, it may be necessary that the motors which drive the different sections of the machine operate at different speeds. Since the amount of draw between sections varies in accordance with the character of the product being manufactured, it is necessary that the speeds of the section drive motors be independently adjustable in order to effect the correct ratios between the speeds of the sections. After these correct speed ratios have been effected, it is necessary to maintain them substantially constant during subsequent speed changes of the machine as a whole and also during constant speed operations at any value to which the speed of the machine may have been adjusted, in order to prevent breakage of the web or formation of a loop in the web between sections.

Accordingly, a further object of the invention is the provision of means for actuating the brush shifting mechanisms to maintain these ratios between the speeds of the section drive motors substantially constant under the conditions usually encountered in operation.

In a control system of this character, it is also necessary that the operator be able to stop, start, and accelerate each section drive motor individually and after it has been accelerated to the correct speed, to transfer control of the motor to the means for automatically maintaining the predetermined ratios between the speeds of the various sectional drive motors.

In carrying the invention into effect in one form thereof, a master speed device is provided, together with means responsive to a deviation of the ratio of the speed of the drive motor with respect to the speed of the master speed device from a predetermined value for actuating the brush shifting mechanism of the drive motor to restore the speed ratio to the predetermined value. Means are also provided for starting and accelerating the drive motor, together with means responsive to a speed of the drive motor having a predetermined relationship to the speed of the master speed device for transferring control of the brush shifting mechanism of the drive motor to the speed ratio deviation responsive means which automatically maintains the predetermined speed ratio between the speeds of the motor and the master speed device.

In a specific embodiment of the invention, the speed ratio maintaining means comprises an electrical motion transmitting device driven by the master speed device, a second electrical motion transmitting device driven by the drive motor, and an electrical differential motion receiving device mechanically connected to the brush shifting mechanism of the drive motor and electrically connected to the transmitting devices for responding to deviations in the speed ratio of the drive motor and master speed device to actuate the brush shifting mechanism of the drive motor. Means are provided for energizing and starting the drive motor, together with means for actuating the brush shifting mechanism for accelerating the motor, and means responsive to the voltages of the transmitting devices serve to transfer the constrol of the brush shifting mechanism to the automatic speed ratio maintaining means after the drive motor has been accelerated to a speed having a predetermined relationship to the speed of the master speed device.

For a better and more complete understanding of the invention, reference should now be had to the following specification and to the accompanying drawings of which

Figure 1:
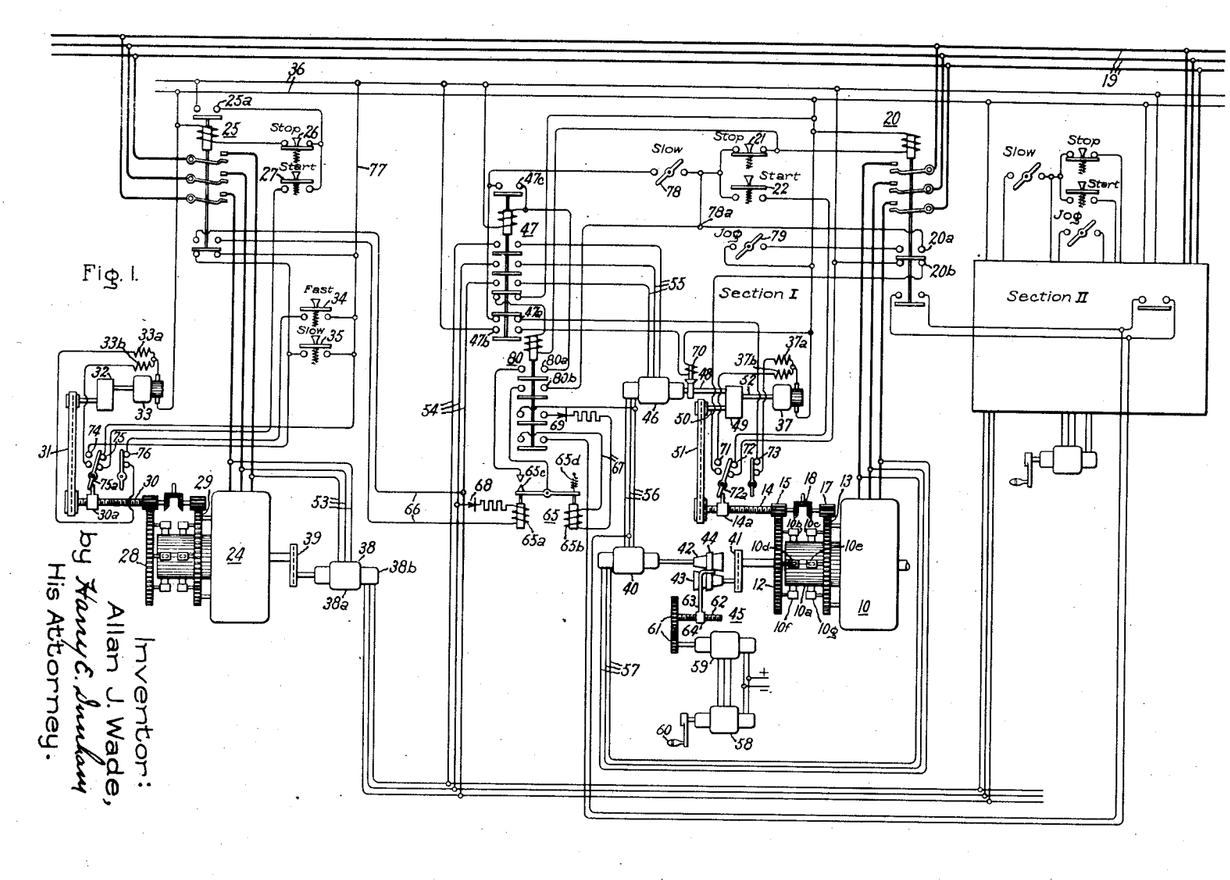
Fig. 1 is a simple, diagrammatical sketch of an embodiment of the invention as embodied in a control system having a separate master speed device and a plurality of sections.
Figure 2:
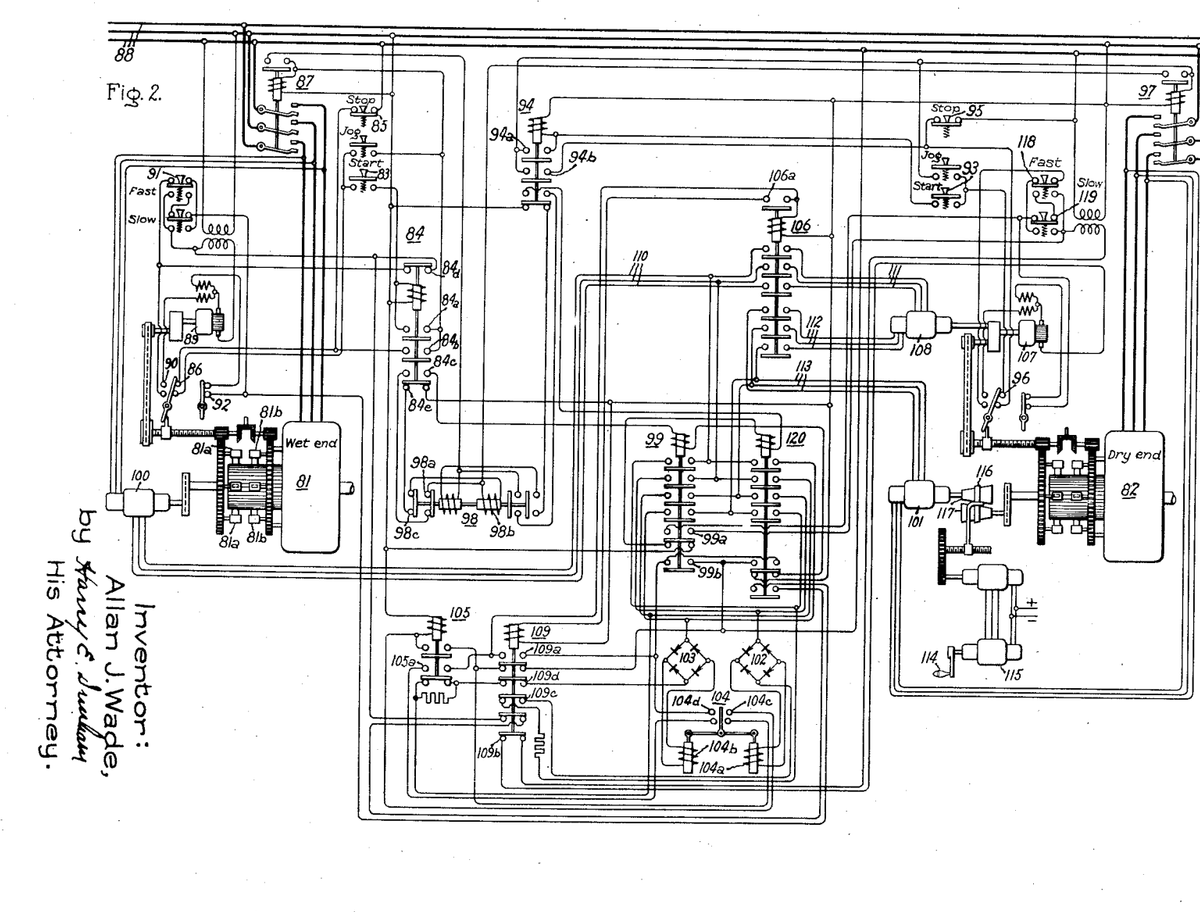
Fig. 2 is a simple, diagrammatical representation of an embodiment of the invention in which one of the section drive motors serves as the master speed device.

Referring now to the drawings, a section I of a sectionalized apparatus or machine, such for example, as a paper making machine (not shown), is driven by a commutator type alternating current motor 10 provided with speed adjusting brush shifting mechanism. Since the drives and control mechanisms for the remaining sections of the machine are identical with the drive and control mechanism for section I, only the drive and control mechanism for the section I are shown in detail. The drive and control mechanism for a second section II are conventionally represented in the drawings. Although only two sections are illustrated in the drawings, it will be understood that various sectionalized apparatuses and machines may and often do have more than two sections, and in such cases the control for the one section which is described in the following will be duplicated at all the other sections.

The section motor 10 is similar in some respects to a wound rotor induction motor. In addition to the usual primary and secondary windings (not shown), it is provided with an adjusting winding (not shown) which is similar to a direct current armature winding and is connected to a commutator 10a. The secondary winding is constructed like the primary winding of a conventional wound rotor induction motor, except that the phases are electrically independent of each other and both ends of each phase are brought out for connection to the brushes 10b, 10c, 10d, 10e, 10f, and 10g which bear on the commutator 10a. The motor is provided with two brush holder yokes 12 and 13. Brushes 10b, 10d, and 10f are mounted on yoke 12, and brushes 10c, 10e and 10g are mounted on yoke 13. These two brush holder yokes 12 and 13 are arranged to shift in such a way as to vary the voltage applied to the secondary winding.

Corresponding terminals of the phases of the secondary winding are connected to brushes on one brush yoke, and the opposite terminals of the phases of the secondary winding are connected to brushes on the other yoke. When the two brushes to which the terminals of a secondary phase are connected are on the same commutator segment, the adjusting winding is, in effect, idle; the secondary winding is short-circuited, and the motor operates as a wound rotor induction motor with speed corresponding to the number of poles and frequency of the supply. As the brushes are moved apart, a section of the adjusting winding is included in series relationship with the secondary winding, causing the secondary winding to generate a voltage to balance the voltage impressed upon it by the adjusting winding, thereby causing the motor to change its speed. The mechanism for shifting the brushes is illustrated as a shaft 14 carrying a pinion 15 which meshes with gear teeth on the yoke 12 and a pinion 17 meshing with gear teeth on the yoke 13 and connected through bevel gearing 18 to the shaft 14. Thus when the shaft 14 is rotated, the yokes 12 and 13 rotate in opposite directions. Rotation of the shaft 14 in one direction increases the speed of motor 10 and rotating it in the other direction decreases the speed. The motor operates both above and below the synchronous speed and may have a range of approximately 3:1 or greater.

Motor 10 is supplied from a suitable source such as represented by the three supply lines 19 to which the primary winding of the motor 10 is arranged to be connected by means of a suitable switching device illustrated as an electromagnetically actuated contactor 20 under the control of suitable control devices illustrated as a normally closed, manually operated "stop" push button type switch 21 and a normally open, manually operated "start" push button type switch 22.

For the purpose of maintaining the correct speed relationship between the section drive motors, a master speed device is provided and means are provided for actuating the brush shifting mechanism of the section drive motors to maintain such a ratio between the speed of each section drive motor and the master speed device that the correct speed relationships are maintained between the section drive motors. Although any suitable type of master speed device may be utilized, an adjustable speed commutator type alternating current motor 24 similar to section motor 10 is preferred. This motor is arranged to be connected to the supply source 19 by means of a suitable switching device illustrated as an electromagnetically actuated contactor 25 which, in turn, is controlled by suitable control devices illustrated as manually operated, normally closed push button type "stop" switch 26 and manually operated, normally open push button type "start" switch 27. Brush yokes 28 and 29 are connected through reduction gearing to the shaft 30 which, in turn, is connected through a chain drive 31 and reduction gearing 32 to the shaft of a pilot motor 33. This pilot motor 33 is illustrated as a split field series type commutator motor which is arranged to be connected to a single phase supply source for rotation in one direction or the other by means of suitable control devices illustrated as manually operated, normally open push button type switches 34 and 35. When the push button 34 is closed, the pilot motor 33 is connected to the single phase supply source 36 through the field winding 33a, and the brush yokes 28 and 29 of motor 24 are rotated in such a direction as to increase the speed of motor 24. On the other hand, when the push button 35 is depressed, the pilot motor 33 is connected to the source 36 through the other split field winding 33b for rotation in such a direction as to rotate the brush yokes 28 and 29 in the opposite direction and thereby decrease the speed of the motor 24. Consequently, push button switch 34 is referred to as the fast push button and push button 35 is referred to as the slow push button. A similar split field series pilot motor 37 is provided for actuating the brush shifting mechanism of section drive motor 19.

Although the control mechanism for maintaining the correct speed ratio between the section drive motors and the master speed motor 24 is the same for all section drive motors, only the control mechanism for the section drive motor 10 is illustrated and described. An electrical motion transmitting device 38 is connected through suitable gearing 39 to the shaft of master speed motor 24, and a similar electrical motion transmitting device 40 is connected to the shaft of section drive motor 10 through suitable gearing 41 and a variable speed device comprising cone pulleys 42 and 43 connected by means of a belt 44, the position of which on the pulleys is arranged to be changed by means of a suitable belt shifting device 45 to vary the drive ratio between the shafts of motor 10 and the shafts of the transmitting device 40.

An electrical differential motion receiving device 46 is arranged to be electrically connected to the transmitting device 38 when the switch 47 is closed and is also electrically connected to the transmitting device 40. The rotor member of the differential motion receiving device 46 is connected to an input member 48 of a mechanical differential device 49, the output shaft 50 of which is connected through a chain drive 51 to the input shaft 14 of the brush shifting mechanism of section drive motor 10. A second input member 52 of mechanical differential device 49 is connected to the shaft of pilot motor 37.

Electrical motion transmitting devices 38 and 40 and electrical differential motion receiving device 46 are physically similar to three phase wound rotor induction motors. In this connection transmitting device 38 comprises a stator member 38a which is provided with a three phase primary winding connected by means of conductors 53 to the source 19 when the contactor 25 is closed, and a rotor member 38b provided with a three phase distributed secondary winding in inductive relationship with the primary winding. The structures of transmitting device 40 and receiving device 46 are identical with the structure of transmitting device 38, and accordingly, a description of the structure of these devices is omitted.

The secondary winding of transmitting device 38 is arranged to be connected through conductors 54 and 55 to the stator winding of differential receiving device 46 when contactor 47 is closed, and the rotor winding of receiving device 46 is electrically connected by means of conductors 56 to the secondary winding of transmitting device 40, the primary winding of which is connected through conductors 57 to the supply source 19 when contactor 20 is closed.

Operation of this electrical motion transmitting and receiving system is as follows: If the rotor member of transmitting device 40 is restrained and the rotor member of transmitting device 38 is rotated, the rotor of differential receiving device 46 will reproduce the rotations of the rotor of transmitting device 38. Similarly, if the rotor of transmitting device 38 is restrained and the rotor of transmitting device 40 is rotated, the rotor of differential receiving device 46 will reproduce the rotation of the rotor of transmitting device 40. If the rotors of both transmitting devices 38 and 40 are rotating and the rotor of transmitting device 38 is rotating faster than the rotor of transmitting device 40 is rotating, the rotor of differential receiving device 46 will rotate in one direction at a speed equal to the difference between the speeds of transmitting devices 38 and 40, whereas if the speed of the rotor of transmitting device 40 is greater than the speed of the rotor of transmitting device 38, the rotor of differential receiving device 46 will rotate in the opposite direction at a speed equal to the difference in the speeds of transmitting devices 40 and 38. If the speed of the rotor of transmitting device 38 is equal to the speed of the rotor of transmitting device 40, the rotor of differential receiving device 46 will remain at rest.

The belt shifting mechanism 45 also comprises an electrical motion transmitting and receiving system consisting of any transmitting device 58 and a receiving device 59. These devices are similar to the transmitting and receiving devices 38, 40, and 46 with the exception that their primary windings are single phase windings and are excited from a suitable source represented by the plus and minus signs, which source may be and preferably is the same as the source 36 from which the pilot motors 33 and 37 are supplied. The rotor member of transmitting device 58 is provided with a hand crank 60, and the rotor member of the receiving device 59 is connected through reduction gearing 61 to the screw 62. The belt shifter 63 is connected to a nut 64 which slides along the screw 62 when the latter is rotated. Thus by turning the hand crank 60, the belt 44 is shifted to such a position on the pulleys 42 and 43 that when the speed of the section drive motor 10 attains the desired value, the rotor of transmitting device 40 will rotate at the same speed as the rotor of transmitting device 38. Obviously, this invention includes the use of other forms of electrical motion transmitting devices in place of the transmitting devices 38 and 40, such for example, as single phase type motion transmitting devices similar to devices 58 and 59, or alternating current generators, or frequency changers.

Suitable means are provided for transferring the control of the brush shifting mechanism of the section drive motor 10 from the pilot 37 to the automatic speed ratio control mechanism, i. e., electrical motion transmitting and receiving devices 38, 40, and 46 after section drive motor 10 has been accelerated to the correct speed. This means is illustrated as a balanced voltage relay 65 having an operating coil 65a connected through conductors 66 and 54 to one phase of the secondary winding of transmitting device 38 so as to be responsive to the induced voltage of the secondary winding which is proportional to the speed of the rotor of transmitting device 38 and therefore, proportional to the speed of master speed motor 24, and an operating coil 65b connected by means of conductors 67 to one phase of the secondary winding of transmitting device 40 so as to be responsive to the secondary induced voltage and therefore proportional to the speed of section drive motor 10.

In order to eliminate the effects of varying frequency of the variable frequency voltage supplied to the actuating coils 65a and 65b, suitable rectifying means 68 and 69 are included in the connections between the actuating coils and the transmitter secondary windings to which they are respectively connected. Although any suitable rectifying means may be employed, the rectifying devices 68 and 69 are preferably copper oxide type rectifiers.

A spring or gravity actuated solenoid released brake 70 is provided for maintaining the input member 48 of the mechanical differential device 49 at rest when the reversible pilot motor 37 is energized to actuate the brush shifting mechanism.

Motor 10 is provided with limit switch contacts 71 which are opened when the brushes of the motor are in their minimum speed position and which are closed at all other times. Also the motor is provided with limit switch contacts 72 which are closed when the brushes are in the minimum speed position and opened at all other times. A third pair of limit switch contacts 73 are opened when the brushes are in their maximum speed position and closed at all other times. Master speed motor 24 is provided with a similar set of limit switch contacts 74, 75, 76.

With the foregoing understanding of the elements and their organization in the system, the operation of the system itself will readily be understood from the following detailed description: The apparatus is shown in its normal, de-energized condition with the brushes of the section drive motors 10 and the master speed motor 24 in their minimum speed positions. Master speed motor 24 is started by depressing the start button 27 to complete an energizing circuit for the operating coil of line contactor 25 that is readily traced from the lower side of supply source 36 through the coil of contactor 25, normally closed contacts of stop button 26, contacts of start button 27 (in the closed position thereof), contacts 75 of the limit switch mechanism, and thence by conductor 77 to the opposite side of the supply source. Contactor 25 closes in response to energization and connects master speed motor 24 to the supply source 19. Since the brushes are in the minimum speed position, motor 24 operates at minimum speed. Contactor 25 in closing also closes its auxiliary contacts 25a to establish a holding circuit for the operating coil of the contactor through the contacts of the stop button 26 independent of the limit switch contacts and start button contacts so that the contactor will remain sealed in after the start button has been released or the limit switch contacts 75 have been opened. The speed of the master speed motor 24 may now be adjusted to any desired value by depressing the fast button 34 to connect pilot motor 33 to the supply source 36. This circuit is traced from the upper side of supply source 36 to the contacts of the fast push button 34, contacts 76 of the limit switch mechanism, field winding 33a and armature of pilot motor 33 to the lower side of the supply source. Motor 33 drives the brush shifting mechanism and effects rotation of the brush carrying yokes 28, 29 in a direction to increase the speed of the master speed motor 24. As the brush shifting mechanism is actuated from its minimum speed position toward its maximum speed rotation, a nut 30a travels to the right along screw 30 and snaps movable contact member 75a away from engagement with contacts 75 and into engagement with contacts 74. When the speed of motor 24 has been accelerated to the desired value, fast push button 34 is released and pilot motor 33 is disconnected from source 36. Master speed motor 24 continues to operate at this speed until one or the other of the push buttons 34, 35 is depressed to effect a further speed change.

If it is desired to bring a section drive motor to a desired speed and to tie in with the master speed motor 24, the slow and jog buttons for that section are left closed. For example, if it is desired to bring the section motor 10 up to speed, slow switch 78 and jog switch 79 are closed. Following this, start button 22 is depressed to complete an energizing circuit for the operating coil of line contactor 20 that extends from the lower side of supply source 36 through the operating coil of contactor 20, stop push button 21, start push button 22, contacts 72 of the limit switch mechanism and thence to the upper side of the supply source. Contactor 20 closes to connect motor 10 to the supply source 79. Since the brushes of motor 10 are in the minimum speed position, the motor operates at minimum speed. In the closed position of contactor 20, auxiliary contacts 20a are bridged by the movable contact members to complete a sealing-in circuit for the coil of contactor 20 through jog switch 79 independent of the contacts of the start button 22 and the contacts 72 of the limit switch, so that the contactor 20 will remain closed after the start button 22 is released or the contacts of the limit switch are opened. Simultaneously the pilot motor 37 is connected to source 36. The circuit is traced from the lower side of the supply source 36 through the armature and field winding 37a, contacts 73 of the limit switch, normally closed contacts 47a of switch 47, slow switch 78, contacts 20a of contactor 20, jog switch 79 to the lower side of supply source 36. Since the brake 70 is set, and the input member 48 of mechanical differential device 49 is restrained, rotation of pilot motor 37 rotates the brush shifting mechanism of motor 10 to increase its speed.

Simultaneously with the closing of contactor 20, contactor 80 whose operating coil is connected in parallel with the operating coil of contactor 20 is closed.

As the threaded input shaft 14 of the brush shifting mechanism of motor 10 is rotated to increase the speed of the motor, the nut 14a travels to the right along the threaded shaft and moves the movable contact member 72a away from engagement with stationary contact 72 and into engagement with stationary contact 71.

When line contactor 25 was closed to start master speed motor 24, a voltage was induced in the secondary winding of master transmitting device 38 and applied as a rectified voltage to the operating coil 65a of balanced voltage relay 65 in a direction to separate the contacts 65c. Similarly, when line contactor 20 was closed to start section drive motor 10, a voltage was induced in the secondary winding of section transmitter device 40 and applied as a rectified voltage to the operating coil 65b of balanced voltage relay 65. When the acceleration of the motor 10 has continued to a point at which the speed of the sectional transmitting device 40 becomes equal to the speed of the master transmitting device 38, the voltages applied to operating coils 65a and 65b become equal and the spring 65d closes contacts 65c to complete an energizing circuit for the operating coil of synchronizing relay 47. This circuit is traced from the upper side of the supply source 36 through the operating coil of contactor 47, contacts 80a of contactor 80, contacts 65c of balanced voltage relay 65, contacts 80b to the junction point 78a and thence through the contacts 20a and jog switch 79 to the lower side of supply source 36. Contactor 47 closes in response to energization to complete the electrical connections 54 and 55 between the secondary windings of master transmitter 38 and the primary windings of electrical differential receiving device 46. Simultaneously, contactor 47 opens its contacts 47a to interrupt the connection of pilot motor 37 to the supply source 36 and closes its contacts 47b to complete an energizing circuit for the operating coil of solenoid brake 70 thereby to release the brake. The upper interlock contact 47c of contactor 47 are also closed to complete a sealing-in circuit for the contactor independent of the contacts 65c of the balanced voltage relay. The control of the brush shifting mechanism of section drive motor 10 is now transferred from pilot motor 37 to the automatic speed control means, i. e. electrical motion transmitting and receiving devices 38, 40 and 46.

If on account of a change in load on the section motor 10 or for some other reason, the ratio between the speed of the section motor 10 and the master speed motor 24 should deviate from the predetermined value, e. g. if the speed of the motor 10 should decrease, the speed of section transmitting device 40 would also decrease and as result, the rotor of electrical differential motion receiving device 46 which rotates the input member 48 from mechanical differential device 49 will actuate the brush shifting mechanism of motor 10 in a direction to increase its speed thereby to restore the predetermined ratio between its speed and the speed of the master speed motor 24. The input shaft 52 of mechanical differential device 49 is restrained from movement by means of the non-reversible worm and wormwheel driving connection.

Likewise, if the speed of section drive motor 10 should increase above the desired value, the rotor of electrical differential motion receiving device 46 would rotate in the opposite direction and thereby actuate the brush shifting mechanism of motor 10 in the opposite direction to decrease the speed of the motor and thereby to restore the ratio between the speed of the motor 10 and the speed of the master speed motor 24 to the desired ratio.

If it is desired to change the ratio between the speed of the section drive motor and the speed of the master speed motor 24, it is only necessary to turn the hand crank 60 and thereby to shift the belts 44 to such a position on the cone pulleys that when the desired speed ratio between the speeds of section motor 10 and master speed motor 24 is effected, the speeds of transmitting devices 38 and 49 will be equal. For example, assume that it is desired to reduce the speed of section drive motor 10 with respect to the speed of master speed motor 24. The hand crank 60 is turned in such a direction as to shift the belt 44 to the left on the cone pulley. This causes the speed of transmitting device 40 to become greater than the speed of master transmitting device 38 with the result that the rotor of differential electrical motion receiving device 46 actuates the brush shifting mechanism of motor 10 in such a direction as to reduce the motor speed. Conversely, if the hand crank 60 is rotated in the opposite direction, the speed of motor 10 relative to the speed of master speed motor 24 will be increased.

The speed of the machine as a whole, i. e., the speed of all the section drive motors, may be simultaneously increased or decreased by depressing either the fast push button 34 or slow push button 35 of the master speed step. If the fast push button 34 is depressed, the speed of the master speed motor 24 will be increased, and the automatic speed control mechanism, i. e., the master transmitting device 38, and the section transmitting devices and electrical motion receiving devices will operate to actuate the brush shifting mechanism of the section drive motors to increase their speed. When the speed of the machine as a whole has reached the desired value, the fast push button is released and the machine continues to operate at this speed. Similarly, if the slow push button 35 is depressed, the speed of the machine as a whole is decreased to the desired value.

If it is desired to stop the section, the stop button 21 is depressed to interrupt the energizing circuits for the operating coils of contactor 20, contactor 80, and synchronizing contactor 47. These contactors open in response to deenergization to disconnect the section drive motor 10 from the supply source 19 and to interrupt the electrical connections between the master transmitting device 38 and differential receiving device 46. Contactor 47 in opening also interrupts the circuit of the solenoid of brake 70 and thereby allows the brake to set. Contactor 20 in dropping out closes contacts 20b to connect pilot motor 37 to the supply source 36. The circuit is traced from the upper side of supply source 36 through contacts 20b, contacts 71 of limit switch bridged by movable contact member 72a, field winding 37b and armature of pilot motor 37 to the lower side of supply source 36. Pilot motor 37 rotates in a direction opposite to that described in the foregoing and returns the brush shifting mechanism of section drive motor 10 to the minimum speed position. As the brush shifting mechanism reaches the minimum speed position, traveling nut 14a actuates the movable limit switch contact member 72a away from engagement with contacts 71 and into engagement with contacts 72. As a result, motor 37 is disconnected from the source and the circuits are left in a reset condition for repetition of the operation described in the foregoing.

Operation of the section drive motor 10 at slow speed only is provided by opening the slow speed switch 78 before the start button 22 is depressed. This prevents energizing the pilot motor 37 for rotation in a direction to increase the speed of section drive motor 10.

Jogging operation of the section is obtained by opening the jog switch 79 which is in the holding circuit of contactor 20. As a result of opening this holding circuit, the start push button 22 becomes a momentary contact push button station, and the section may be jogged or operated as long as the start button 22 is maintained depressed.

The operation of the control for section II and such additional sections as the machine may have is in all respects identical with the operation described in the foregoing.

The modification of the system illustrated in Fig. 2 is in most respects substantially the same as that disclosed in Fig. 1. It differs from the system shown in Fig. 1 primarily in that the master speed step is omitted and that one of the section drive motors serves as the master speed device. It further differs from the apparatus of Fig. 1 in that the solenoid brake for restraining the input member of mechanical differential device 49 is omitted and a worm gear speed reducer is substituted at this point. Provision is also made for starting any one of the section drive motors first and subsequently starting the other section drive motors by tying them in with the first motor starter.

Assuming that the commutator motor 81 is connected to drive the wet end of a paper making machine and that commutator motor 82 is connected to drive the dry end of a paper making machine, the operation of the modified system shown in Fig. 2 is as follows: Start button 83 is depressed to complete an energizing circuit for the operating coil of relay 84 through stop button 85, limit switch contacts 86, contacts of start button 83, operating coil of contactor 84 to the opposite side of the supply source. Relay 84 picks up and seals itself in through contacts 84a and 84b. Simultaneously, contacts 84a connect the operating coil of line contactor 87 in parallel with operating coil of contactor 84. Contactor 87 picks up and connects commutator motor 81 to the supply source represented by the three lines 88. Motor 81 will come up to a speed which will be the slowest speed of normal operation, because, as in the system of Fig. 1, the brushes are returned to the minimum speed position at every stop. In this connection interlock 84c of contactor 84 energizes pilot motor 89 for rotation in a direction to return the brushes 81a and 81b to their minimum speed positions. Limit switch contacts 90 are opened at the end of this brush returning operation to stop the pilot motor. It is impossible to start the section motor 81 when the brush shifting mechanism is in any position other than the minimum speed position because then the switch contacts 86 are opened in all positions except the minimum speed position of the brush shifting mechanism.

If it is now desired to increase the speed of wet end motor 81, the fast push button 91 is depressed. This will start the pilot motor 89 and cause it to rotate in a direction such as to shift the brushes toward the maximum speed position. At the maximum speed position, the contacts of limit switch 92 are opened thereby to disconnect and stop the pilot motor 89. The pilot motor 89 can also be disconnected and stopped at any speed intermediate the minimum and maximum speeds by releasing the fast push button 91.

Assuming that the wet end motor is now running at the desired speed and that it is desired to bring the dry end motor up to speed and to tie it in with the wet end motor to provide for automatic control of the speed of both motors, the dry end start push button 93 is depressed. This completes an energizing circuit for the operating coil of contactor 94 which is traced from the lower supply line 88 through the normally closed contacts of stop push button 95, contacts of limit switch 96, contacts of start push button 93, coil of contactor 94 to the middle line of the supply source. Contactor 94 picks up and seals itself in through the contacts 94a, 94b and stop button 95. Contacts 94a in closing connect the operating coil of contactor 97 in parallel with the operating coil of contactor 94. Contactor 94 closes in response to energization and connects the dry end motor 82 to the supply source 88. Interlock 84c of contactor 84 and interlock 98a of transfer relay 98 are closed and consequently an energizing circuit is completed for the operating coil of wet end start selector contactor 99.

Electrical motion transmitting devices 100 and 101 are so connected to the supply source 88 that their induced secondary voltages decrease as the speed of the wet end and dry end motors 81 and 82 to which they are respectively connected increase. Thus, the voltage induced in the secondary winding of the receiver 101 is greater than the secondary induced voltage of the transmitter 100 and dry end motor 82 is connected to the line. These voltages are rectified by means of respective rectifiers 102 and 103 and applied to operating coils 104a and 104b respectively of balanced voltage relay 104. Therefore the flux produced by relay coil 104b exceeds the flux produced by coil 104a, and these fluxes act in opposite directions upon the movable contact member of the relay.

Since these voltages, at the instant the dry end motor 82 is connected to the line, are not equal, relay 104 picks up immediately after relay 99 closes and its movable contact member bridges stationary contacts 104c to complete an energizing circuit for the operating coil of relay 105. In this connection it is to be noted that contacts 104d of relay 104 are opened before contacts 105a of relay 105 are closed, and this prevents energizing the operating coil of synchronizing contactor 106 until relay 104 drops out. In this connection it is also to be noted that relay 99 in picking up closes contacts 99a to start the dry end pilot motor 107. Since the shaft of differential electrical receiving device 108 is connected to mechanical differential device 109 through a non-reversible worm and wormwheel drive, pilot motor 107 actuates the brush shifting mechanism of dry end motor 82 in such a direction as to accelerate the motor.

As the dry end motor 82 accelerates and the speed of transmitting device 101 approaches the speed of transmitting device 100, the secondary induced voltage of transmitter 101 approaches the secondary induced voltage of transmitter 100. Eventually these voltages become substantially equal and when this condition obtains, the balanced voltage relay 104 drops out. When the balanced voltage relay 104 drops out, its movable contact member bridges stationary interlock contacts 104d to complete an energizing circuit for the operating coil of synchronizing contactor 106 through contacts 105a of relaying contactor 105. Synchronizing contactor 106 picks up and closes its interlock contacts 106a to complete an energizing circuit for the operating coil of relaying contactor 109. Relaying contactor 109 picks up and closes its interlock contacts 109a to seal itself and contactor 106 in with contacts 99b of relay 99.

Synchronizing contactor 106 in closing connects the secondary winding of transmitting device 100 to the stator winding of electrical differential motion receiving device 108 to conductors 110 and 111, and also connects the rotor winding of electrical differential receiving device 108 to the secondary winding of transmitting device 101 through conductors 112 and 113. It is to be noted at this point that when relaying contactor 109 picked up, it opened its normally closed contacts 109b thereby deenergizing pilot motor 107. Electrical differential motion receiving device 108 now functions to maintain the speed of motors 82 and 81 in a predetermined ratio in the manner described in the description of the operation of the system of Fig. 1. It is also to be noted that in the closed position of relaying contactor 109, interlocks 109c and 109d are opened and disconnect balanced voltage relay coils 104a and 104b from the supply source.

If it is desired to change the ratio between the speed of the dry end motor 82 and the speed of the wet end motor 81, this can be done by operating the hand crank 114 of transmitting device 115. This results in shifting the position of the belt 116 on the pulleys 117 which, in turn, results in changing the speed of the dry end motor in a manner identical with that described in the operation of the system of Fig. 1.

If it is assumed that both motors are again at standstill and that it is desired to start the dry end motor 82 before starting the wet end motor 81, the dry end start button 93 is depressed which causes contactor 94 to pick up and seal itself in as described in the foregoing, and contactor 94 in closing picks up line contactor 97 to connect the dry end motor to the supply source 88. As a result, motor 82 accelerates to its minimum basic speed as described in the foregoing. The right-hand operating coil 98b of transfer relay 98 is temporarily energized through left-hand interlock contacts 98c and normally closed interlocks 84e of contactor 84. This actuates the armature of relay 98 to the right to the opposite position from that in which it is illustrated. This relay does not have a spring bias return and accordingly, its armature remains in the position to which it is last actuated by energization of one of its operating coils.

The dry end motor 82 is now brought up to any desired speed by manipulation of the fast and slow push buttons 118 and 119 which control the direction of rotation of the dry end pilot motor 107.

After transfer relay 98 has been actuated to the opposite position from that in which it is illustrated, the sequence of starting the wet end motor 81 with the dry end motor 82 already running is the same as previously described for the starting of the dry end motor with the wet end motor running with one exception. That exception is that dry end selector start contactor 120 closes instead of wet end start selector contactor 99. Contactor 120 in closing connects the dry end electrical motion transmitting device 101 to rectifier 102 and connects the wet end electrical motion transmitting device 100 to rectifier 103, which is just the reverse of the connections completed for starting from the wet end. All of the other relays involved in the starting sequence function in the same manner as previously described.

The stopping, jogging, and speed changing operations are all accomplished in the same manner as these operations are accomplished in the system of Fig. 1, as explained in detail in the foregoing description of the operation of the system of Fig. 1.

Although in accordance with the provisions of the patent statutes, this invention is described as embodied, and the principle has been explained together with the best mode in which it is now contemplated applying that principle, it is to be understood that the apparatus and connections shown are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:

1. A control system for maintaining a predetermined speed relationship between a master speed device and a motor provided with a commutator and brush shifting mechanism for varying the speed of said motor comprising an electrical master transmitting device driven by said master speed device, an electrical motion transmitting device driven by said motor, means responsive to a variation in the ratio of the speeds of said master device and said motor for actuating said brush shifting mechanism to restore said speed ratio comprising an electrical differential motion receiving device electrically connected to said transmitting devices and mechanically coupled to said brush shifting mechanism, driving means for actuating said brush shifting mechanism to vary the speed of said motor, and means responsive to a predetermined speed between said motor and said master device for transferring control of said brush shifting mechanism from said driving means to said electrical differential motion receiving device.

2. A motor control system for maintaining a predetermined ratio between the speeds of a master speed device and a commutator motor provided with brush shifting mechanism for varying its speed comprising an electrical motion transmitting device mechanically connected to be driven by said master speed device, a second electrical motion transmitting device mechanically connected to be driven by said motor, means responsive to a variation in said speed ratio for actuating said brush shifting mechanism to vary the speed of said motor to decrease said variation comprising an electrical differential motion receiving device electrically connected to said transmitting devices and mechanically connected to said brush shifting mechanism means for adjusting said speed ratio to a desired value, driving means for actuating said brush shifting mechanism to vary the speed of said motor, and means responsive to a predetermined speed between said motor and said master device for transferring control of said brush shifting mechanism from said driving means to said electrical differential motion receiving device.

3. A motor control system for maintaining a predetermined speed ratio between a master speed device and a commutator motor having brush shifting mechanism for varying the speed of said motor comprising an electrical motion transmitting device driven by said master device, an electrical motion transmitting device driven by said motor, a mechanical differential device having an output member connected to said brush shifting mechanism and two input members, means responsive to a variation in said speed ratio for actuating said brush shifting mechanism to decrease said variation comprising an electrical differential motion receiving device electrically connected to said transmitting device and mechanically connected to one of said input members, driving means connected to the other of said input members for actuating said brush shifting mechanism to vary the speed of said motor, and means responsive to a predetermined speed between said motor and said master device for transferring control of said brush shifting mechanism from said driving means to said electrical differential motion receiving device.

4. A control system comprising in combination a master speed device, a commutator motor having mechanism for shifting the brushes to vary the speed thereof, an electric pilot motor for actuating said brush shifting mechanism for accelerating said commutator motor, an electrical motion transmitting device mechanically connected to said master speed device, a second electrical motion transmitting device mechanically connected to said commutator motor, means responsive to variation in a predetermined ratio between the speeds of said commutator motor and master device for actuating said brush shifting mechanism to restore said speed ratio comprising an electrical differential motion receiving device electrically connected to said transmitting devices and mechanically connected to said brush shifting mechanism, and means responsive to attainment of said predetermined speed ratio upon acceleration of said commutator motor for transferring control of said commutator motor from said pilot motor to said motion transmitting and receiving devices.

5. A control system comprising in combination a master speed device, a commutator motor having brush shifting mechanism for varying the speed, a manually operated device and a pilot motor controlled thereby for actuating said brush shifting mechanism to accelerate said commutator motor, an electrical motion transmitting device connected to said master speed device, a second electrical motion transmitting device connected to said commutator motor, means responsive to deviation of the speeds of said commutator motor and master speed device from a predetermined ratio for actuating said brush shifting mechanism to decrease said deviation, and means responsive to the voltages of said transmitting devices for transferring control of said brush shifting mechanism from said pilot motor to said motion transmitting and receiving devices upon acceleration of said commutator motor to a speed at which a predetermined relationship is established between the speeds of said commutator motor and said master speed device.

6. A control system comprising in combination a master speed device, a commutator motor having brush shifting mechanism for varying its speed, means responsive to a deviation of the ratio of the speeds of said master device and motor from a predetermined value for actuating said brush shifting mechanism to decrease said deviation, an electric pilot motor mechanically coupled to said brush shifting mechanism for accelerating said commutator motor, and means responsive to acceleration of said commutator motor to a speed at which a predetermined relationship is established between the speeds of said commutator motor and said master speed device for transferring control of said brush shifting mechanism from said pilot motor to said speed ratio deviation responsive means.

7. A control system comprising in combination a commutator motor having a brush shifting mechanism for varying its speed, a mechanical differential device having an output member connected to said brush shifting mechanism and two input members, means responsive to a deviation of the ratio of the speeds of said motor and said device from a predetermined value for actuating one of said input members thereby to actuate said brush shifting mechanism to decrease said deviation, a manually operated control device and a pilot motor controlled thereby and connected to the other of said input members for actuating said brush shifting mechanism to accelerate said commutator motor, and means responsive to acceleration of said commutator motor to a speed having a predetermined ratio to the speed of said master device for rendering said speed ratio deviation responsive means active and said pilot inactive.

8. A control system comprising in combination a master speed device, a commutator motor having brush shifting mechanism for varying its speed, a mechanical differential device having an output member connected to said brush shifting mechanism and two input members, means responsive to deviation of the ratio of the speeds of said motor from a predetermined value and said master speed device from a predetermined value for actuating one of said input members thereby to actuate said brush shifting mechanism to restore said speed ratio to said predetermined value, a brake for said one input member, a pilot motor connected to the other of said input members, a manually operable control device for effecting energization of said pilot motor to actuate said brush shifting mechanism to accelerate said commutator motor, and means responsive to acceleration of said commutator motor to a speed having a predetermined ratio to the speed of said master device for deenergizing said pilot motor and for releasing said brake to render said speed ratio deviation responsive means active.

9. A control system for maintaining a predetermined ratio between the speeds of a master speed device and a commutator motor having brush shifting mechanism for varying the speed comprising in combination, a mechanical differential device having an output member connected to said brush shifting mechanism and two input members, a pilot motor connected to one of said input members, and a manually operable control device for effecting energization of said pilot motor to move the brushes of said commutator motor from the low speed position toward the high speed position to accelerate said commutator motor, means responsive to a deviation of the ratio of the speeds of said commutator motor and a master speed device from a predetermined value for actuating the other of said input members to actuate said brush shifting mechanism to decrease said deviation, a brake for said other member, means responsive to establishment of a predetermined relationship between the speeds of said commutator motor and master device for deenergizing said pilot motor and releasing said brake to render said speed ratio deviation responsive means active, means for deenergizing said main motor and means responsive to deenergization of said main motor for reenergizing said pilot motor to return said brushes to said low speed position.

10. A motor control system for establishing and maintaining a predetermined ratio between the speeds of a master speed device and a commutator motor having brush shifting mechanism for varying the speed comprising in combination a mechanical differential device having an output member connected to said brush shifting mechanism and two input members, a pilot motor mechanically coupled to one of said input members and a control device for energizing said pilot motor to accelerate said commutator motor, means responsive to a deviation in the ratio of the speeds of said commutator motor and master speed device for actuating said brush shifting mechanism to restore said speed ratio comprising an electrical motion transmitting device connected to said master device, a second electrical motion transmitting device connected to said commutator motor and an electrical differential motion receiving device electrically connected to said transmitting devices and mechanically connected to the other of said input members, and means responsive to establishment of a predetermined relationship between the speeds of said commutator motor and master speed device for transferring the control of said brush shifting mechanism from said pilot motor to said transmitting and receiving devices comprising a balanced voltage relay having an operating coil connected to be responsive to the voltage of one of said transmitting devices and a second operating coil connected to be responsive to the voltage of the other of said transmitting devices.

11. A control system comprising in combination a main alternating current commutator motor provided with speed adjusting brush shifting mechanism, a master speed device comprising a second alternating current commutator motor provided with speed adjusting brush shifting mechanism, a mechanical differential device having an output member mechanically connected to the brush shifting mechanism of said main motor and two input members, an electric pilot motor for actuating one of said input members to accelerate said main motor, means responsive to a deviation in the ratio of the speeds of said main commutator motor and master speed device for actuating the other of said input members to decrease said deviation and means responsive to establishment of a predetermined speed relationship between said main motor and master speed device for transferring control of the brush shifting mechanism of said main motor from said pilot motor to said speed ratio deviation responsive means.

12. A motor control system comprising in combination a main alternating current commutator motor provided with speed adjusting brush shifting mechanism, a master speed device comprising a second alternating current motor having speed adjusting brush shifting mechanism, means for connecting said second motor to a supply source, a pilot motor for actuating said brush shifting mechanism, a control device and means controlled thereby for connecting said main motor to a supply source, means responsive to operation of said control device for connecting said pilot motor to a supply source to accelerate said main motor, means responsive to deviation of the ratio of the speeds of said main motor and a master speed device for actuating said brush shifting mechanism to decrease said deviation, and means responsive to a speed of said main motor having a predetermined ratio to the speed of said master speed device for transferring control of said brush shifting mechanism from said pilot motor to said deviation responsive means.

13. A motor control system comprising in combination, a main alternating current commutator motor provided with speed adjusting brush shifting mechanism, a master speed device comprising a second alternating current commutator motor provided with speed adjusting brush shifting mechanism, a mechanical differential device having an output member connected to said brush shifting mechanism and two input members, means responsive to deviation of the ratio of the speeds of said main motor and master speed device from a predetermined value for actuating said brush shifting mechanism to decrease said deviation comprising an electrical motion transmitting device driven by said master speed device, a second electrical motion transmitting device driven by said main motor and an electrical differential motion receiving device electrically connected to said transmitting devices and mechanically connected to one of said input members, means for maintaining said deviation responsive means inactive, a pilot motor mechanically connected to the other of said input members, a control device and means controlled thereby for connecting said main motor to a source of supply and for connecting said pilot motor to a source of supply thereby to actuate said brush shifting mechanism to accelerate said main motor, and means responsive to a speed of said main motor having a predetermined relationship to the speed of said master speed device for deenergizing said pilot motor and for rendering said deviation responsive means active.

14. A motor control system comprising in combination a plurality of commutator motors each having speed adjusting brush shifting mechanism and driving means for actuating said brush shifting mechanism, means for energizing any one of said motors, means for energizing any other of said motors and the driving means for its associated brush shifting mechanism to accelerate said other motor, and means for producing control voltages proportional to the speeds of said motors and means responsive to a predetermined relationship of said voltages for deenergizing said driving means thereby to terminate the acceleration of said other motor when the speeds of both said motors have a predetermined relationship.

15. A motor control system comprising in combination, first and second main commutator motors each provided with speed adjusting brush shifting mechanism and driving means for actuating said brush shifting mechanism, a device driven by each of said motors for producing a voltage varying with the motor speed, means for energizing either of said main motors, means for energizing the other of said motors and the driving means for its associated brush shifting mechanism, a device having electrical connections to both of said voltage producing devices and responsive to a speed of the last of said motors to be energized having a predetermined relationship to the speed of the first of said motors to be energized for deenergizing said driving means, and means for reversing said electrical connections when the order of energization of said main motors is reversed.

16. A control system for a pair of commutator motors for driving the sections of a sectionalized apparatus, each of said motors having a speed adjusting brush shifting mechanism comprising in combination, a first pilot motor connected to one of said brush shifting mechanisms, a second pilot motor connected to the other of said brush shifting mechanisms, means for energizing one of said commutator motors, means for energizing the other of said commutator motors, and its associated pilot motor thereby to accelerate said other motor, means responsive to a deviation of the ratio of the speeds of said commutator motors from a predetermined value for decreasing said deviation comprising a first electrical motion transmitting device driven by one of said commutator motors, a second electrical motion transmitting device driven by the other of said commutator motors and an electrical differential motion receiving device mechanically connected to one of said brush shifting mechanisms and electrically connected to said transmitting devices, means for rendering said deviation responsive means inactive, means responsive to a speed of the second of said commutator motors to be energized having a predetermined relationship to the speed of the first of said commutator motors to be energized for deenergizing the energized pilot motor and for rendering said deviation responsive means active comprising a balanced voltage relay having electrical connections to said transmitting devices, and means for reversing said last mentioned electrical connections when the order of energization of said commutator motors is reversed.

17. A drive for apparatus having a plurality of sections operating on a length of material comprising in combination a plurality of alternating current commutator motors, one for each of said sections and each of said motors having speed adjusting brush shifting mechanism, a master speed device, means responsive to a deviation of the speed of each of said motors from a predetermined ratio with respect to the speed of said master speed device for actuating its brush shifting to restore said ratio, means for rendering said speed deviation responsive means inactive, an individual pilot motor connected to each of said brush shifting mechanisms, means for energizing said pilot motors to accelerate said commutator motors, and means responsive to speeds of said commutator motors having a predetermined relationship to the speed of said master device for deenergizing said pilot motors and transferring control to said deviation responsive means.

18. A control system for a plurality of alternating current commutator motors for individually driving the sections of an apparatus having a plurality of sections operating on a length of material, each of said motors having speed adjusting brush shifting mechanism comprising in combination a plurality of mechanical differential devices, one for each of said motors and each of said devices having an output member connected to the brush shifting mechanism of the associated motor and a pair of input members, a master speed device and means responsive to the deviation of the speed of each of said motors from a predetermined ratio with respect to the speed of said master speed device comprising an electrical motion transmitting device driven by said master speed device, a plurality of electrical motion transmitting devices, each driven by a separate one of said motors, and a plurality of differential electrical motion receiving devices, one for each of said motors, each being electrically connected to said master transmitting device and to the transmitting device driven by the associated motor and mechanically connected to an input member of the associated mechanical differential device, a plurality of pilot motors, a separate one of each of said commutator motors connected to the other input member of each of said differential devices, means for energizing each of said pilot motors to accelerate its associated commutator motor, and a plurality of balanced voltage relays, one for each of said commutator motors responsive to a predetermined relationship between the voltages of said master transmitting device and said sectional transmitting devices for deenergizing said pilot motors and transferring control of said brush shifting mechanism to said deviation responsive means.

19. A control system for apparatus having a plurality of sections each driven by an alternating current commutator motor having speed adjusting brush shifting mechanism, the control for each of said motors comprising a mechanical differential device having an output member connected to said brush shifting mechanism and two input members, a master speed device common to all of said motors comprising a variable speed motor and means for adjusting the speed, means responsive to deviation of the ratio of the speeds of said commutator motor and master speed device from a predetermined value for actuating said brush shifting mechanism to restore said ratio comprising an electrical motion transmitting device driven by said master speed device, a second electrical motion transmitting device driven by said motor and an electrical differential motion receiving device electrically connected to said transmitting devices and mechanically connected to one of said input members, an electric pilot motor connected to the other of said input members, a control device for energizing said pilot motor to effect acceleration of said commutator motor, means responsive to a speed of said commutator motor having a predetermined ratio to the speed of said master speed device for deenergizing said pilot motor and transferring control of the speed of said commutator motor to said deviation responsive means.

ALLAN J. WADE.

CERTIFICATE OF CORRECTION.

Patent No. 2,223,195.                                                                 November 26, 1940.

ALLAN J. WADE.

It is hereby certified that error appears in the printed specification of the above numbered patent requiring correction as follows: Page 1, second column, line 29, for "constrol" read --control--; page 4, first column, line 58, for the reference numeral "79" read --19--; and second column, line 21, for "65$^a$" read --65$_a$--; line 53, for "contact" read --contacts--; page 5, first column, line 23, after "equal" insert a period; page 6, first column, line 29, strike out "the" before "contacts"; page 7, first column, line 74, claim 2, after "mechanism" insert a comma; page 8, first column, line 40, claim 7, after "pilot" insert --motor--; page 10, first column, line 32, claim 18, for "mechanism" read --mechanisms--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.